H. A. SHELTON.
LATERAL PROPULSION MEANS FOR MOTOR VEHICLES.
APPLICATION FILED APR. 2, 1917.

1,278,040.

Patented Sept. 3, 1918.
4 SHEETS—SHEET 1.

Witnesses,

INVENTOR,
Harrison A. Shelton.
By
Attorney

H. A. SHELTON.
LATERAL PROPULSION MEANS FOR MOTOR VEHICLES.
APPLICATION FILED APR. 2, 1917.

1,278,040.

Patented Sept. 3, 1918.
4 SHEETS—SHEET 2.

INVENTOR.
Harrison A. Shelton,
By
Attorney.

H. A. SHELTON.
LATERAL PROPULSION MEANS FOR MOTOR VEHICLES.
APPLICATION FILED APR. 2, 1917.

1,278,040.

Patented Sept. 3, 1918.
4 SHEETS—SHEET 3.

Witnesses,

INVENTOR,
Harrison A. Shelton,
By
Attorney.

UNITED STATES PATENT OFFICE.

HARRISON A. SHELTON, OF PASADENA, CALIFORNIA.

LATERAL-PROPULSION MEANS FOR MOTOR-VEHICLES.

1,278,040.          Specification of Letters Patent.          Patented Sept. 3, 1918.

Application filed April 2, 1917. Serial No. 160,872.

*To all whom it may concern:*

Be it known that I, HARRISON A. SHELTON, a citizen of the United States, residing at Pasadena, in the county of Los Angeles and State of California, have invented a new and useful Improvement in Lateral-Propulsion Means for Motor-Vehicles, of which the following is a specification.

My invention relates to motor vehicles and particularly to means attachable to such vehicles for moving the same laterally for short distances to and away from the curb line of the street in congested districts where it is frequently impossible or very difficult to otherwise drive the vehicle into positions between other vehicles by means of the ordinary forward driving means.

It is a primary object, therefore, of my invention to provide a series of traction units which may be readily attached to and detached from the front and rear axles of such vehicles and connected with the usual transmission means of the engine or motor for operation by power from the engine; said units being arranged to operate in planes at right angles to the other traction wheels of the vehicle, so as to move the vehicle, at will, laterally.

A further object of this invention is to provide means for readily associating and disassociating the lateral traction units from the power plant of the vehicle and for rendering the lateral traction units on opposite sides of the vehicle differential relative to each other.

A further object is to provide means for supporting the lateral traction units in planes substantially alined with the planes of the axles when said units are inoperative and for lowering and raising said units to and from operating positions.

A further object is to provide means whereby the lateral traction units may be utilized for supporting the weight of the vehicle off of the ground for the purpose of changing the tires of the longitudinal traction wheels, or for other purposes. Other objects may appear as the description progresses.

Referring to the drawings.

Fig. 11ª is a perspective view of one of the screw locking keys for the members shown in Figs. 10, 11 and 12.

Similar characters of reference are employed throughout the specification and in the several views of the drawings for indicating the same or like parts.

Each of my lateral traction units comprises an upper halved member A which has a ring like extension 1 formed on the top and adapted to be pivotally supported on the extended ends of the axles 2, or 3, as the case may be; and a lower halved member B which is supported movably on the member A by means of four screws 4, 5, 6 and 7 and is adapted to vertical movement relative to the member A.

The two parts of the members A and B are suitably secured together by means of screws or bolts 8 and 9, respectively, which are extended through lugs 10 and 11, respectively, formed on these members. A bracket C is provided for each of the traction units which has a pair of bored extensions 12 and 13 adapted to fit over and be secured to the axles 2 and 3 by means of screws 14, or otherwise, for supporting the driving mechanism for the traction units.

A short drive shaft 15 is provided for each unit which is journaled in a bearing in an arm 16 of the bracket and carries a bevel gear 17 on the inner side of this arm adjacent to the axles 2 and 3. A spur gear 18 is carried by the shaft 15, in each case, and is adapted to rotate therewith and to drive a gear 19 attached to the parallel shaft 20 which is journaled in an extension 21 on the bracket C, a worm 22 being attached to the outer end of the shaft 21 over the center of the axles 2 and 3, which meshes with a sector 23 formed on the extension 1. A bevel gear 24 is loosely supported on the axles of the vehicle between the extensions 12 and 13 of the bracket C and this gear meshes with and is driven by the gear 17 on the shaft 15. The opposite end of shaft 15 has a cone clutch member 25 which is engaged by another clutch member 26 adapted to rotate with the shaft and which is held in frictional engagement with the member 25 by means of a spring 27 which is held in tension between the hub of the member 26 and a collar 28 attached to the shaft 15. The gear 18 and clutch member 25 are loosely held on the shaft 15 while the member 26 is tight thereon, so that the gear and clutch member are thus driven entirely by friction between the two clutch members, for reasons which will hereinafter appear.

The lower portion of the member A of each unit has a relatively large counterbore or recess 29 to receive and house a large spur gear 30 which is rotatably held therein on a vertical shaft 31, this shaft being extended upwardly above the top of the member A and provided thereabove with a bevel gear 32 of the character and size of the gear 17 on the shaft 15. The bevel gear 32 meshes with and is driven by the larger bevel gear 24, and by means of the shaft 31, serves to drive the large gear 30 in the member A.

Figures 3, 6, 7:
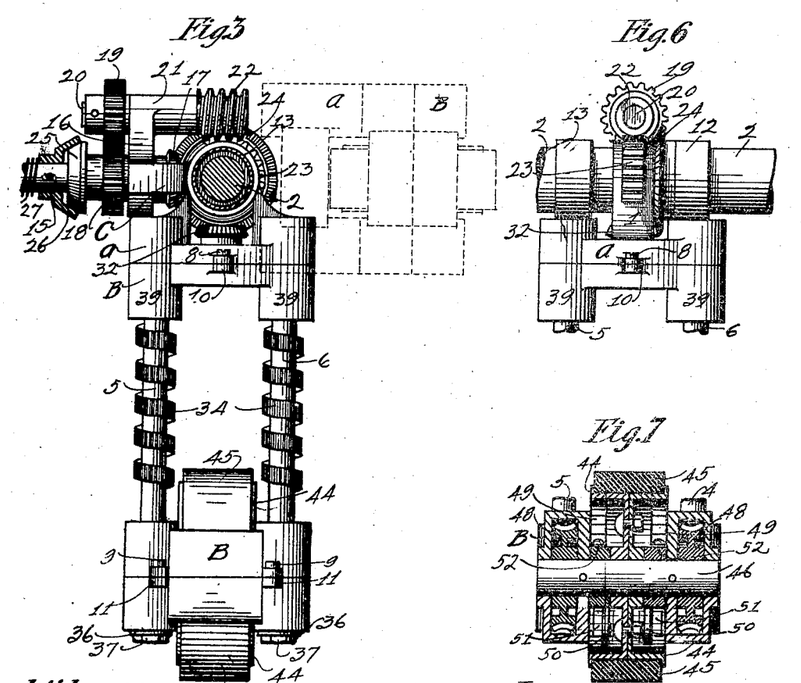
Fig. 3 is an enlarged elevation of one of the assembled traction units shown in position on one of the vehicle axles.
Fig. 6 is a rear elevation of the upper portion of the unit shown in Fig. 3.
Fig. 7 is a sectional elevation of the lower portion of one of the units.
Figures 4, 5:
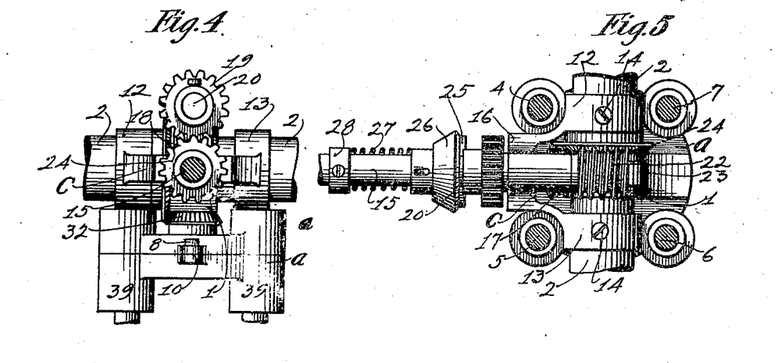
Fig. 4 is an elevation of a portion of the same at right angles to Fig. 3.
Fig. 5 is a plan of one of said units in operative position.
Figure 8:
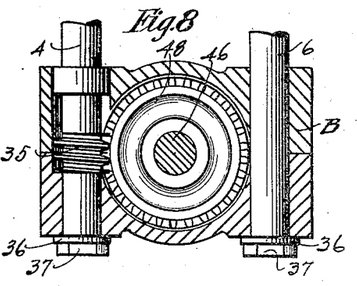
Fig. 8 is a section of the lower portion of one unit in a plane at right angles to Fig. 7.

The screws 4, 5, 6 and 7 which connect the members A and B of each unit are provided with pinions 33 at the top thereof and the threads thereon are of substantially wide face and of rectangular cross section and the peripheries of the threads have gear teeth 34 formed thereon which are alined with the teeth on the pinions 33 and mesh with the common gear 30 in the member A and are rotated by this gear. The lower portions of two of the screws in each unit, 4 and 5, as shown, have worms 35 formed thereon or attached thereto within the member B and the lower ends of all of these screws are extended through the members B and held against vertical movement by means of collars 36 and nuts 37 thereon, as shown in Fig. 3. The screws 6 and 7, as shown, have no worms or threads in the members B.

Figures 11, 11A, 12:
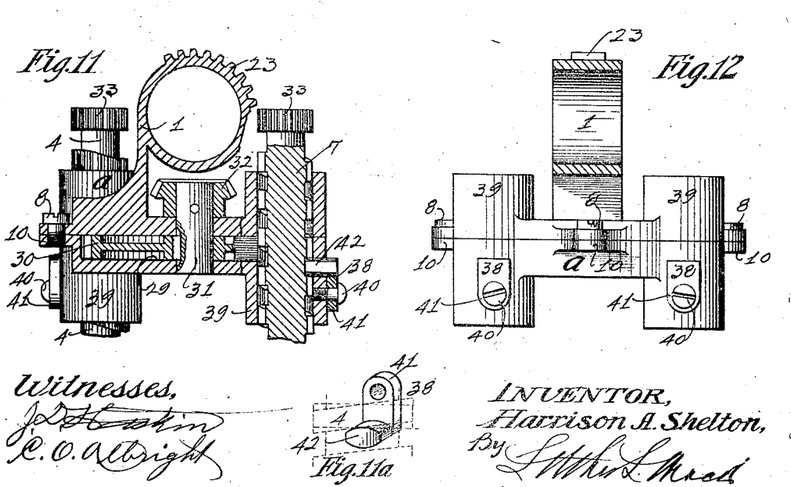
Fig. 11 is a sectional elevation of the same.
Fig. 12 is an elevation of the same at right angles to Fig. 11.

A clearance space is provided on each of the screws above the upper side of the member B and below the pinions 33 near the tops of the screws, as shown in Figs. 3 and 11, and one or more keys 38 are attached to the exteriors of the screw sockets 39 of the member A by means of screws 40 extending through lugs 41 on the keys and into the body of the sockets, as shown in Figs. 11 and 12. The keys have extensions 42 with curved upper and lower faces, as shown in Fig. 11ª, which fit into the threads on the screws 4, 5, 6 and 7 and serve the same function in the sockets as a single thread. The curve of the keys reduces the width of the edges so that the keys may readily enter the space between the toothed threads on the screws, as indicated by broken lines in Fig. 11ª. Thus, when the drive shaft 15 of each unit is rotated, as hereinafter described, the gear 30 in the members A of each unit will rotate the screws 4, 5, 6 and 7 by means of their inter-meshing teeth, and the screws will be threaded either downwardly or upwardly through the members A, as the case may be. The rotary movement of the screws in such case either raises or lowers the members B of each unit, as the lower portions of the members B are secured to the screws between the worms thereon and the nuts at the bottoms of the screws.

When the members B are thus raised upwardly to contact with the bottoms of the members A the clearance spaces on the screws above the tops of the members B will register with the keys 38 and though the screws may then be further rotated, the members A and B will be held in contact without damage to the screws. Similarly, when the members B are lowered to the fullest extent of their movement, the pinions 33 on the upper ends of the screws will mesh with the gear 30 while the clearance spaces immediately below the pinions will register with the keys 38 and the further rotation of the screws may be accomplished without unmeshing the pinions 33 from the gear 30.

Figure 9:
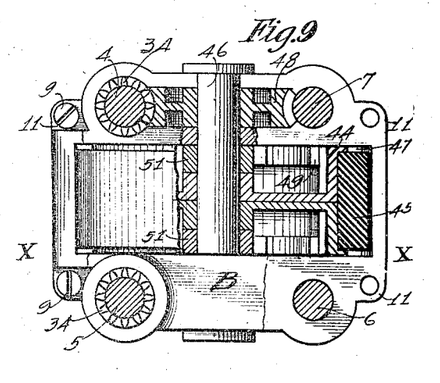
Fig. 9 is a plan, partly in section, of the elements shown in Figs. 7 and 8 and Fig. 9ª is a sectional elevation of the same on the line *x—x* of Fig. 9.
Figure 9A:
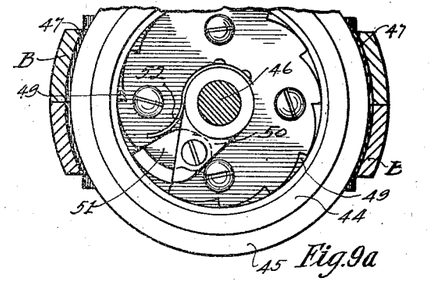
Figure 10:
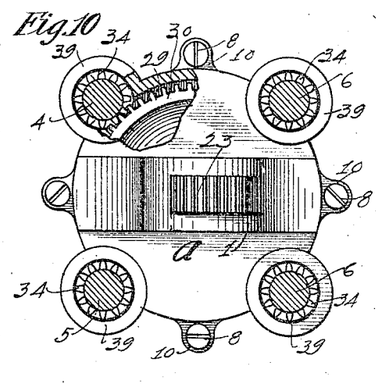
Fig. 10 is a plan, partly broken away, of the upper member of one of the traction units.

Each of the members B carries a relatively small traction wheel 44 with a rubber tire 45 held thereon and these wheels are loosely mounted on shafts 46 which are journaled in the sides of the members B, a central recess 47 being formed in each member for the wheel to rotate and through which it extends, as shown in Figs. 3, 7 and 9. A pair of worm gears 48 are provided in each of the members B on opposite sides of the wheels 44, which are fixed to the shafts 46 and mesh with and are driven by the worms 35 on the screws 4 and 5. The wheels 44 are provided with internal ratchets 49 on the opposite sides of the central webs thereof and which are secured to the rims of the wheels in any suitable manner. Arms 50 are fixed to the shafts 46 so as to rotate with the worm gears 48, and these carry pivotally supported pawls 51 for engagement with the teeth of the ratchets, as shown in Fig. 9ª, the pawls being held in engagement with the rachets by means of springs 52 suitably attached to the arms and resting against the inner sides of the pawls.

It will be observed that when the screws 4, 5, 6 and 7 are rotated in one direction, the wheels 44 will be rotated by means of the worm gears and ratchet mechanism described, while if the screws are reversely turned, the wheels will either remain stationary or they may be turned in an opposite direction without damage to the worm gears.

Figure 1:
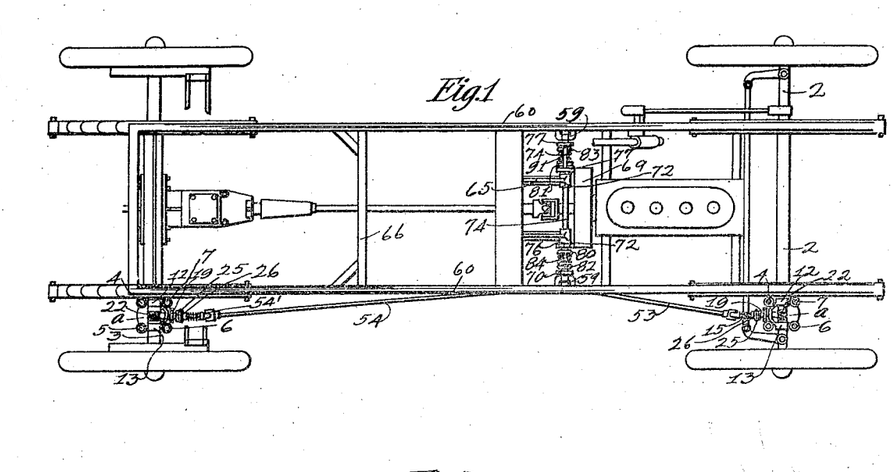
Figure 1 is a plan view of the vehicle running gear showing one side thereof equipped with my improved lateral traction units and the operating means therefor.
Figure 2:
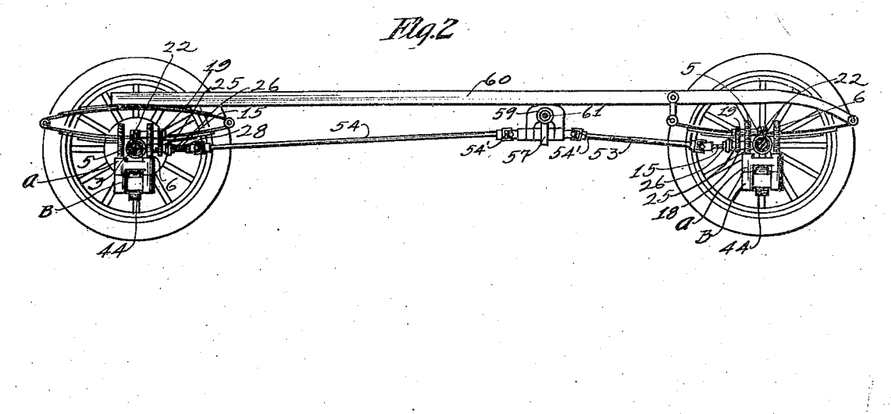
Fig. 2 is a side elevation of the same.

Power is communicated to the individual drive shafts 15 by means of longitudinal shafts 53 leading to the front axle units and 54 leading to the units on the rear axle, universal joints 54' being employed for connecting the drive shaft elements together, as shown in Figs. 1 and 2. The adjacent ends of the shafts 53 and 54 are connected as shown with a short longitudinal shaft 55 on each side of the vehicle which shaft carries a worm gear 56 in mesh with and adapted to be driven by a worm 57, the shafts 55 being journaled in suitable bearings on the bracket 59 which is suitably attached to and suspended from the side frame members 60 of the vehicle frame. The worm 57 on each side of the vehicle is fixed to or formed on the outer ends of the shafts 61 or 62 which are alined transversely of the frame and supported at their outer ends in bearings 63 on the brackets 59 and at their inner ends in bearings 64 in the brackets 65 which are suitably attached to the transverse frame member 66.

Figure 13:
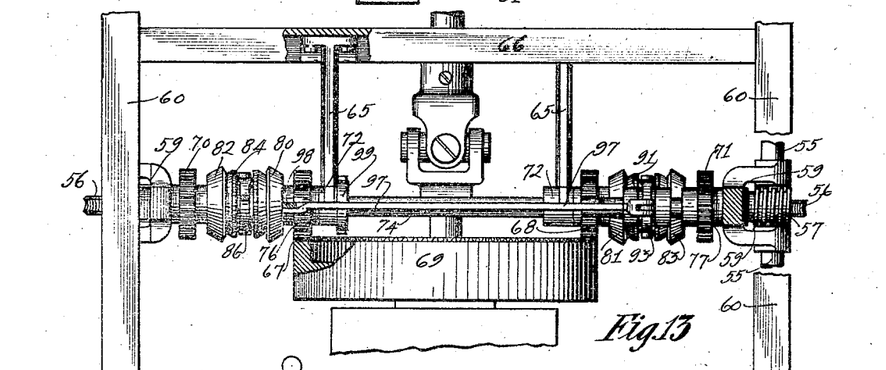
Fig. 13 is a plan of the operating mechanism for connecting the traction units with the engine and a portion of the running gear frame.
Figure 14:
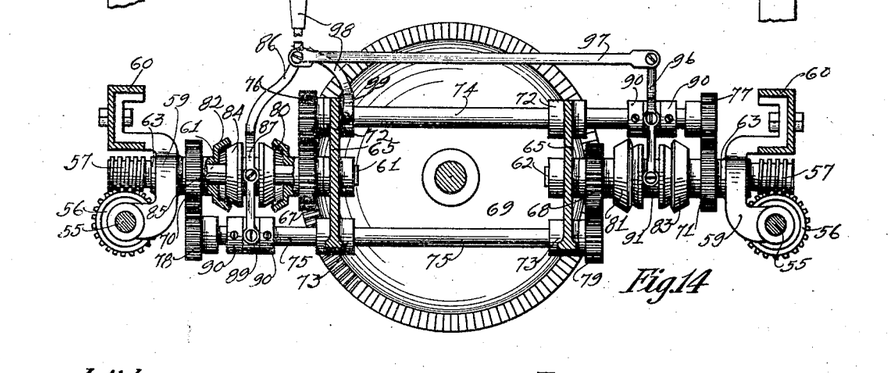
Fig. 14 is an elevation of the same.

The inner ends of the transverse shafts 61 and 62 are provided, respectively with gears 67 and 68 which mesh with and are driven by the engine fly wheel 69, in the rear edge of the rim of which teeth are formed, as shown in Figs. 13 and 14, the gears 67 and 68 being loosely mounted on their respective shafts. Gears 70 and 71 which are similar in size to those 67 and 68 are loosely mounted on the shafts 61 and 62, respectively, at points near the bearings 63 of the brackets 59. The brackets 65 have bearings 72 and 73, respectively, above and below the shafts 61 and 62, in which shafts 74 and 75, respectively, are revolubly supported and on the ends of the shafts 74 and 75, respectively, gears 76 and 77 and 78 and 79 are provided for rotation with the shafts. The gears 76 and 77 on shaft 74 mesh, respectively, with gears 67 and 71 on the shafts 61 and 62, respectively. The gears 78 and 79 on shaft 75 mesh, respectively, with gears 70 and 68 on shafts 61 and 62, respectively.

Gears 67, 68, 70 and 71 have clutch members 80, 81, 82 and 83, respectively, formed thereon or attached thereto, which have conical recesses formed therein. An intermediate clutch member 84 is slidably supported on the shaft 61 between members 80 and 82 and is adapted to rotate therewith by means of a key or feather 85, this member having an annular groove midway of its ends and the ends thereof being tapered to conform to the conical recesses in the clutch members 80 and 82. The member 84 is normally out of engagement with the members 80 and 82 and may be selectively engaged therewith by means of an operating member 86 which has a yoke 87 at the bottom carrying a pair of rollers 88 on opposite sides of and for engagement with the annular groove in the center of the member 84. The lower ends of the yoke 87 are pivoted to opposite sides of a loose collar 89 on the shaft 75 and this collar is held against longitudinal movement on the shaft by means of set collars 90 on opposite ends of the collar 89. Thus the movement of the operating member 86 will effect the movement of the central clutch member 84 longitudinally of the shaft 61 for engagement with either of the clutch members 80 or 82, and as motion is thus communicated from opposite points on the fly wheel rim, the shaft 61 may be rotated in different directions, selectively, by the movement of the clutch member 84, as described.

A clutch member 91, which is similar to the member 84 on shaft 61, is similarly mounted on the shaft 62 and is capable of rotation with its shaft by means of a key or feather 92. This member is positioned on the shaft between the conical clutch members 81 and 83 attached to or formed on the gears 68 and 71, respectively. An operating member 93 is provided for the member 91 which has a yoke 94 with ends 95 carrying rollers 96 for engagement with the annular groove in the center of the member 91, the upper portion of this member being pivoted to a collar 96 on the shaft 74 between set collars 90, as in the case of the operating member 86 for the clutch member 84, just described.

Figure 15:
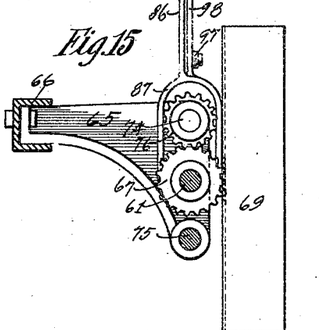
Fig. 15 is a longitudinal elevation of the driving shafts supporting means shown in Figs. 13 and 14.
Figure 16:
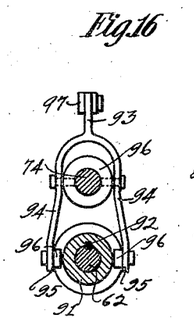
Fig. 16 is a transverse section of one of the driving shafts and clutch operating means therefor.
Figure 17:
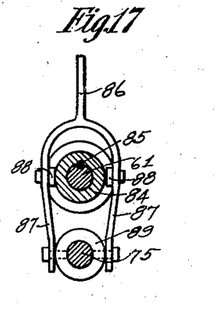
Fig. 17 is a similar section of the other driving shaft and clutch operating means therefor.

The upper end of the operating member 93 is pivoted to one end of a link 97 which extends transversely of the frame above the shaft 74 to a point above the gear 76 where it is pivotally connected with a lever 98 having a yoke 99 formed on the lower end thereof which is pivotally attached to one of the bearings 72 of the shaft 74, so that the operating handle thereof will occupy the same longitudinal plane of the handle for the operating lever 86, as shown in Fig. 13. It is desirable that both operating handles should be positioned as close together as possible, as shown in Fig. 15 to permit the simultaneous operation of both clutches; but, each handle may be operated separately when it becomes necessary to reverse the normal action of the traction units.

It will be understood that when both clutches are in their normal positions and thus out of engagement with their coöperating clutch members, no motion may be imparted to the screws 4, 5, 6 and 7 of the four traction units, and therefore to the traction wheels. It is obvious also, that the leads on the several worms and screws included in my mechanism may be changed so that both operating levers may be moved together in a single direction for operating all of the traction wheels in one direction, or, reversely, as may be desired. It is not essential that the lead of the threads on the worms and screws on opposite sides of the vehicle should be in one direction, for the operating members are capable of movement in both directions and elasticity of action is thus provided.

In the initial operation, let it be assumed that the units are occupying their normal horizontal positions, substantially in the planes of the vehicle axles with the members A and B of each unit in close contact and the screws 4, 5, 6 and 7 extended upwardly on opposite sides of the axles. When the operating members are moved transversely in the proper direction and the clutches on the shafts 61 and 62 are thus engaged, motion is imparted to all of the operating mechanism, the shafts 15 are caused to rotate, thus rotating the bevel gears 17, 24 and 32, the large spur gears 30 in each unit and the screws 4, 5, 6 and 7 are also rotated and begin to thread their way downwardly through the members A, thus lowering the members B from contact therewith. The worms 22 of each unit are simultaneously rotated by means of the connections described, and by their connection with the sectors 23 on the extensions 1 of the members A, each entire unit, including the members A, B, screws 4, 5, 6 and 7 and the traction wheels in member B, are gradually lowered until the screws occupy vertical positions and the upper sides of the members A come into contact with the lower portion of the bracket C, as shown in Fig. 3, whereupon the movement of the several units around the axis of the axles 2 and 3 is stopped and the same will be held immovably in vertical positions beneath the axles of the vehicle. The stoppage of this movement also stops the movement of the worms 22 and during any further movement of the screws and other rotating parts, the spring actuated clutch 25—26 will slip.

The main operating clutches may be kept in engagement until the base members B of each unit has been extended downwardly to its fullest extent, such action serving to raise the vehicle entirely from the ground in the same manner as that accomplished by an ordinary jack. When the lifting screws have become completely extended, and the main traction wheels of the vehicle have been raised from contact with the ground, the lateral traction wheels 44 are caused to revolve by means of their driving worm gears, as described, and the vehicle may be moved laterally from a position in the street opposite an opening at the curb directly into the opening, or from the opening into the street, as the case may be.

The mechanism shown and described, provides for connecting only two of the lateral traction wheels, with the driving mechanism, the two wheels on one side of the vehicle being capable of positive rotation in one direction and the two on the other side in an opposite direction, while the remaining two wheels in either case may be turned in the direction of travel of the power driven wheels by contact with the ground. It is thought that two power driven wheels will be sufficient in any event to provide ample power for moving the vehicle, and one set of these wheels, for instance could be utilized to move the vehicle into the curb and the other away from the curb. It will be understood that the ratchet mechanism in the small traction wheels, as stated, provides means for communicating the power to the wheels in but a single direction while the wheels are released for independent action in an opposite direction. This means eliminates a more complicated reversing mechanism, and further, it is essential that during the movement of the vehicle, the lifting screws should turn in but a single direction, for otherwise, during a reverse movement thereof, the screws would lower the vehicle to the ground and defeat the objects of the invention.

All of the traction units are restored to normal positions, as indicated in broken lines in Fig. 3, by reversing the operating members, thus raising the units to horizontal planes, lowering the vehicle, and extending the screws upwardly. The downward movement of the screws 4, 5, 6 and 7 is limited by the keys 38 which engage the lower sides of the pinions 33, and the upward movement thereof is limited by means of the engagement of the members B with the members A.

The system of gears shown in Figs. 13 and 14 for imparting motion to the unit-driving shafts, will be understood to provide forward and reverse motion for both of the shafts 61 and 62, for the gears 67 and 68 are driven by opposite sides of the fly wheel of the engine, and the gears 70 and 71 are respectively rotated in an opposite direction to the gears 67 and 68.

The engine being supported rigidly on the vehicle frame, I support the driving mechanism also on this frame so that the vibration and rebounding of the frame on the springs will in no way affect the meshing of the gears with the fly wheel, and the universally jointed driving shafts at the sides of the vehicle amply compensate for any such movement.

It is preferable that the traction units should be supported on the axles of the vehicle at points directly under the springs but this is not in all cases possible, and I have therefore shown the units mounted at the outside of the springs, but the same may be suitably mounted inside of the springs or at other convenient points on the axles.

It will be recognized that the structure shown herein will no doubt be modified to suit different conditions, but it is conceived to be possible to substantially alter the structure from the form shown without departing from the spirit of my invention or enlarging the scope thereof.

Having thus described my invention, what I claim is:

1. Lateral propulsion means for motor vehicles comprising in combination with the running gear and frame, laterally operating traction wheels on opposite portions of the vehicle axles, supporting means therefor capable of being pivotally raised and lowered into operating position, and forward and reverse gearing operably connecting the traction wheels with the engine, said gearing including screw and gear elements for lifting and driving said wheels.

2. Lateral propulsion means for motor vehicles comprising laterally operated traction wheels adjacent each of the main traction wheels, pivoted means for raising and lowering the same into and from operating position, and gearing connecting said traction wheels with the engine for operation in opposite directions, said gearing including lifting screws having gears on the threads thereof.

3. Lateral propulsion means for motor vehicles comprising a set of traction wheels pivotally supported on the vehicle running gear in proximity to the main traction wheels, a countershaft operated from the engine or motor, and combined lifting and driving gearing connecting said traction wheels with said countershaft for operation in opposite directions, each of said wheels having a plurality of screw threaded gears for rendering the wheels operative.

4. Lateral propulsion means for motor vehicles comprising combined lifting and propulsion screws mounted near the main traction wheels of the vehicle, each of said screws comprising separable body elements, one of said body elements being stationarily supported on the vehicle running gear, and the other of said body elements being movable relative thereto, a traction wheel mounted in each of said movable body elements, and gearing connecting the vehicle motor and said traction wheels and journaled in said body elements for lifting the main traction wheels of the vehicle from contact with the ground, and propelling said lateral traction wheels, as set forth.

5. Lateral propulsion means for motor vehicles comprising a body member pivotally suspended from the vehicle axle, a plurality of lifting screws having gears formed thereon and journaled in said body member, gearing connecting said screws with the vehicle engine, a relatively movable body member supported on the extended ends of said screws, a traction wheel revolubly supported in said movable body member and adapted to be driven by said screws, and means for connecting and disconnecting said gearing at will.

6. Lateral propulsion means for motor vehicles comprising a set of power driven screw threaded lifting and driving gears supported on the vehicle axles, means for applying power at will to said gears and for simultaneously moving the same into operative position, and a traction wheel operable by each set of said screws, as set forth.

7. A lateral propulsion device for motor vehicles comprising a stationary and a movable housing normally in engagement suspended from the axle of the vehicle, traction means on said movable housing, and combined lifting and driving gearing for spacing said movable housing relative to said stationary housing and for operating said traction means.

8. Lateral propulsion means for motor vehicles comprising a plurality of power operated combined lifting and driving screws supported on the vehicle axle, a relatively stationary and a movable member thereon, a traction element supported on said movable member, and means for imparting power from said screws to said traction element.

9. Lateral propulsion means for motor vehicles comprising main and auxiliary traction wheels arranged for rotation in relatively right angular planes, and gearing for operably connecting said auxiliary wheels with the engine and including a plurality of helical lifting and driving gears for raising and lowering said auxiliary wheels into and from operating position, and for driving said wheels when the same are lowered.

10. Lateral propulsion means for motor vehicles comprising relatively stationary and movable members supported on the vehicle axles, screws operably connecting said members, traction wheels supported on said movable members, and gearing acting upon the peripheries of the threads of said screws for rotating said traction wheels.

11. Lateral propulsion means for motor vehicles comprising relatively stationary and movable members supported on the vehicle axles, a traction wheel supported on each of said movable members, and screw threaded gears connecting said wheels with the engine, means for spacing said members and rotating said wheels.

12. A power communicating device including relatively stationary and movable bodies, a driving element in one of said bodies, a driven element in the other of said bodies, and screw means connecting said bodies and having gear teeth formed on the face of the threads thereof for mesh with said driving element.

13. A power communicating device including a driving element and a driven element, and screw means operably connecting said elements and having gear teeth of uniform pitch diameter formed on the face of the threads thereof for mesh with said driving element.

14. A power communicating device including substantially spaced driving and driven elements, said driven element being movable relative to said driving element, and a threaded gear of uniform pitch diameter for operably connecting said elements.

15. A power transmission device including a driving gear, a driven element movable relative thereto, and means consisting of screws having gear teeth of uniform pitch diameter formed on the threads thereof for operably connecting said driving and driven elements.

16. A power transmission device including relatively movable driving and driven elements, and common screw threaded gear means of uniform pitch diameter for moving said elements apart and rotating said driven element.

17. A power transmission device including relatively stationary and movable driving and driven elements pivotally held for movement together about a common axis, and common screw threaded gear means of uniform pitch diameter for spacing said elements apart and rotating said driven element.

18. A power transmission device including primary driving means connected with a source of power, secondary driving means operable thereby, driven means operable at a point remote from said driving screw threaded gear means of uniform pitch diameter, and combined means for spacing said driven means relative to said secondary driving means and for rotating said driven means.

19. A power transmission device including primary driving means and secondary driving means operated thereby, a driven element movably supported relative to said secondary means, screws operated by said secondary means for moving said driven element relative to said secondary means, and gears formed on the threads of said screws for rotating said driven element.

20. A power transmission device including a source of power, forward and reverse gearing leading therefrom, a plurality of driving elements connected with said gearing, a driven element spaced from and movably supported relative to each of said driving elements, and screw threaded gearing of uniform pitch diameter for commonly connecting said driving and driven elements for rotation.

21. A power transmission device including a source of power, forward and reverse gearing leading therefrom, means for connecting and disconnecting said gearing relative to said source of power, relatively movable driving and driven elements connected therewith, and elongated screw threaded gears of uniform pitch diameter operably connecting said driving and driven elements, said gears having threads cut therein by means of which said driving and driven elements may be spaced apart.

22. A power transmission device including a shaft like element a spiral thread of uniform diameter therearound, said thread having gear teeth formed thereon.

23. A transmission device including a shaft like element having screw threaded gear teeth of uniform diameter formed thereon parallel with the axis thereof and extending in a spiral course throughout a portion of the length thereof.

24. A power transmission device comprising driving and driven means including a shaft like gear with teeth formed thereon in a spiral course and of uniform diameter, said teeth paralleling the axis of said gear.

25. A power transmission element comprising a body having gear teeth arranged parallel with the axis thereof and traversing the periphery thereof in a spiral course and of uniform diameter.

26. A mechanical movement comprising a driving element and a spirally threaded driven element having teeth of uniform diameter intermeshing with each other, one of said elements being adapted to be simultaneously revolved and moved longitudinally as said elements are operated together.

27. A transmission device including a driving element, a plurality of driven elements meshing therewith, and spirally formed gear means of uniform diameter formed on said driven elements for moving the same longitudinally as the said elements are operated together.

28. A transmission device including a driving element and supporting means therefor, driven means meshing therewith, traction spiral gear means of uniform diameter operated by said driven means, and means formed on said driven means for moving said traction means relative to said driving element during the rotation of said driving and driven elements.

29. A transmission device including driving means supported on the vehicle axles and geared for operation by the engine, traction elements supported in proximity thereto, and to spiral gear means of uniform diameter interposed between said driving means and said traction elements for rotating and moving said traction elements relative to said driving element during the rotation thereof.

HARRISON A. SHELTON.

Witnesses:
 RUTH A. SHELTON,
 J. D. HASKIN.